Patented Jan. 18, 1927.

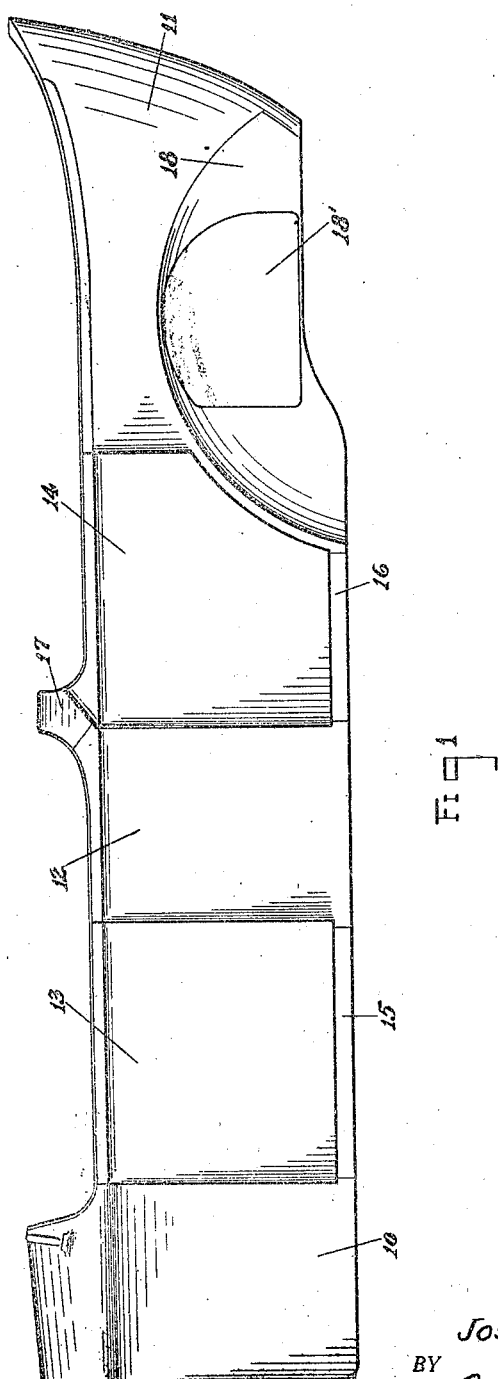

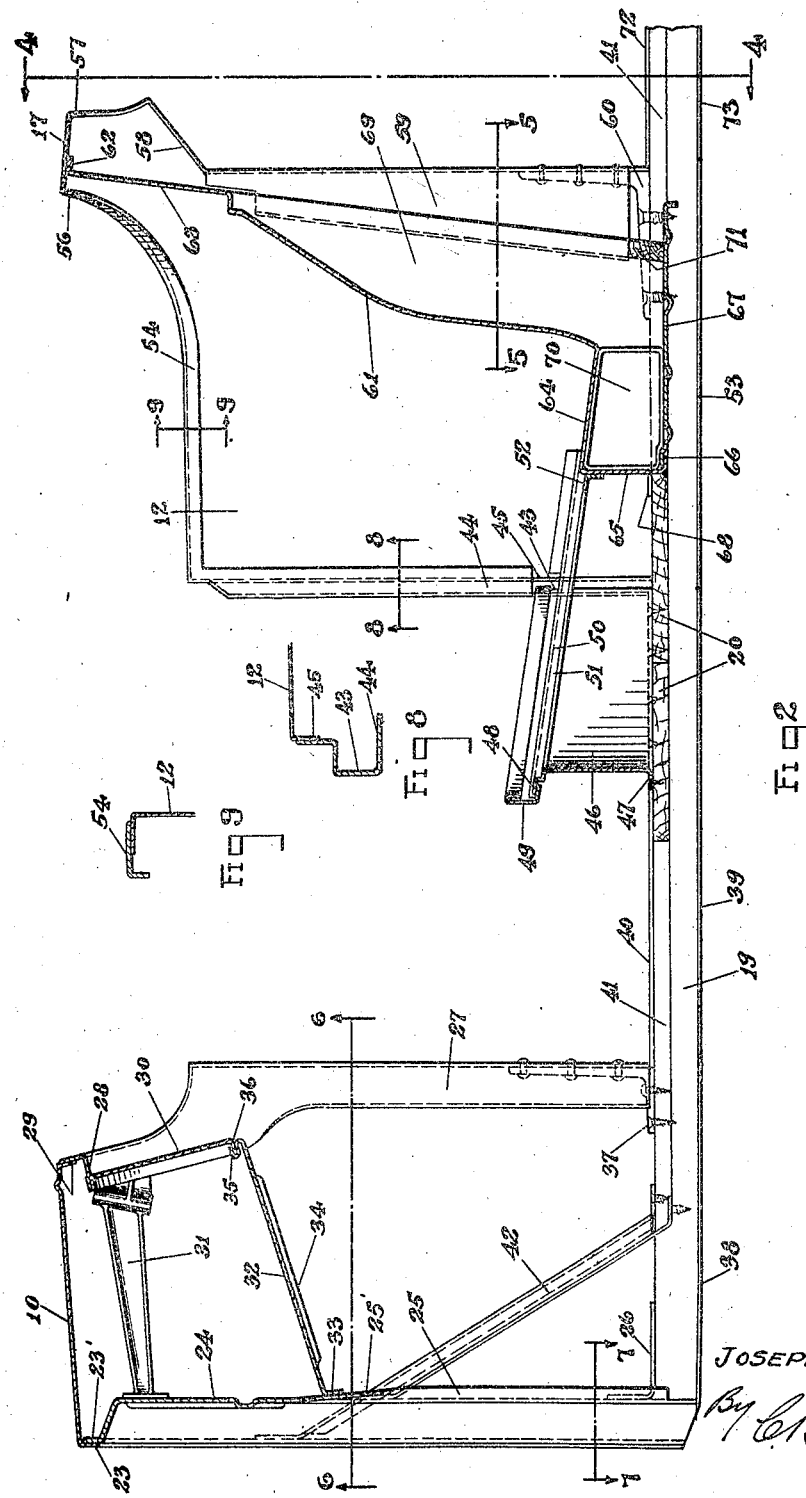

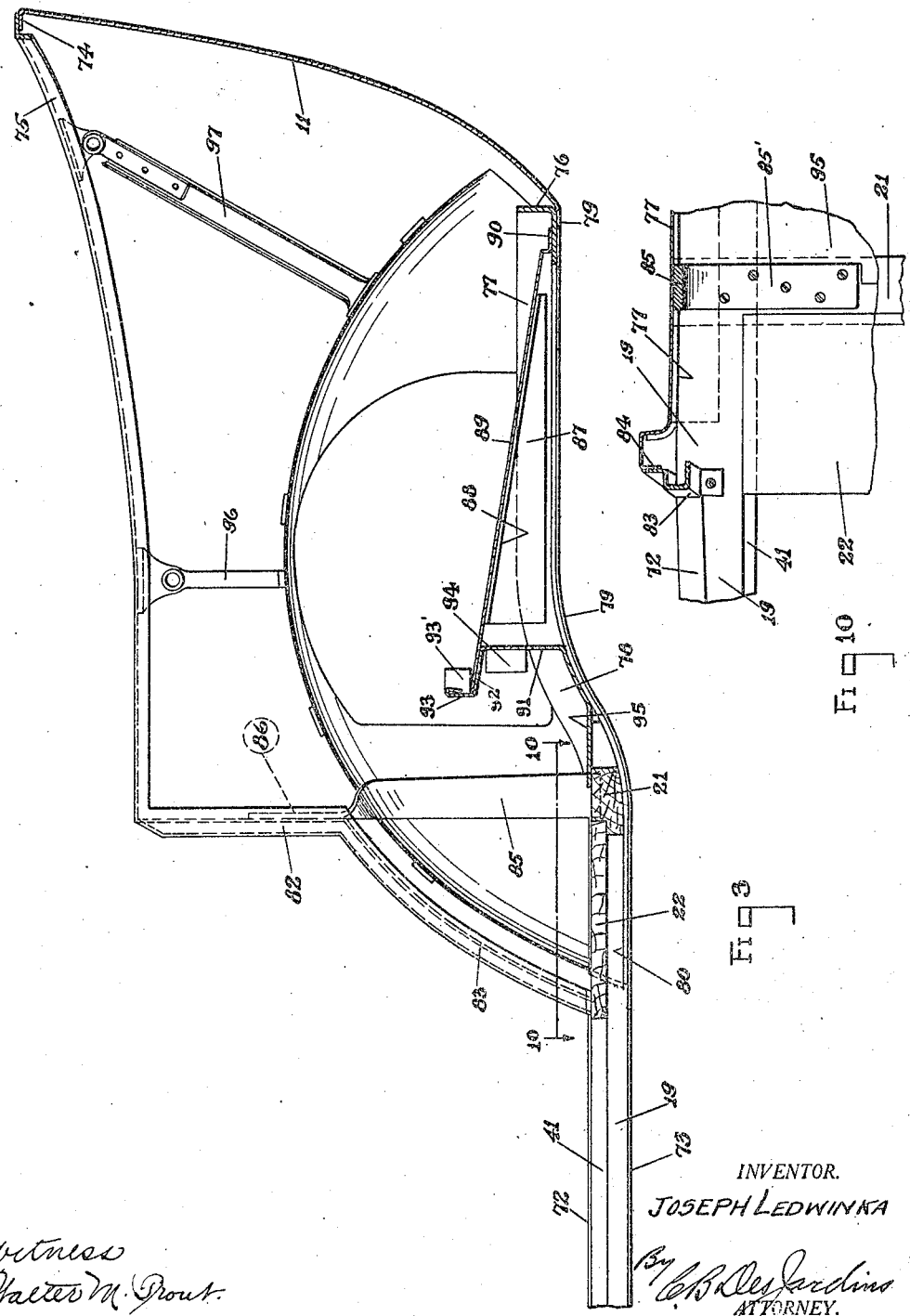

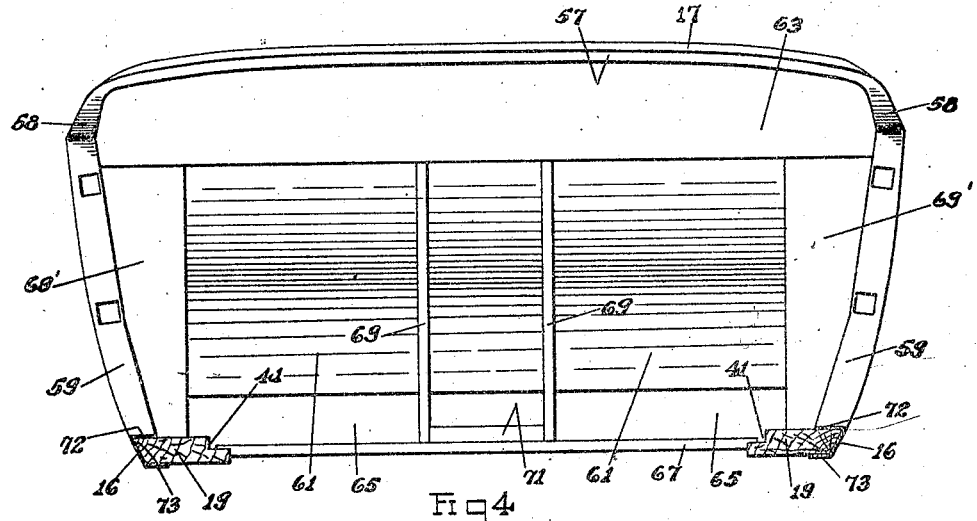
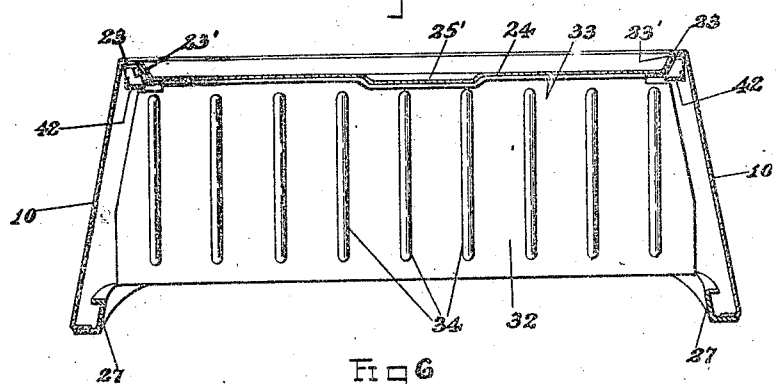
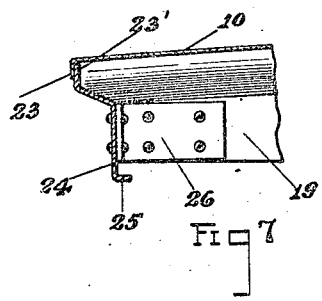
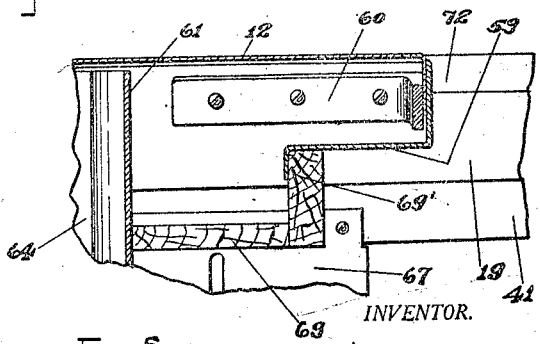
INVENTOR.
JOSEPH LEDWINKA
BY
ATTORNEY.

1,615,177

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY.

Application filed February 3, 1922. Serial No. 533,846.

This invention relates to improvements in automobile bodies and, more particularly, to improvements on the invention described and claimed in my pending application for Letters Patent for automobile bodies, Serial No. 506,121, filed October 7, 1921, to which application cross-reference is hereby made.

At the present time, there are two types of automobile bodies in use, known as the composite body and the all-metal body, respectively. The composite body comprises a wooden, supporting framework, including sills, seat supports and vertically-extending door posts to which the metal sheets, forming the body shell, are tacked. This form of body has certain advantages for use where the production is small, inasmuch as the cost of the necessary dies is relatively small. The all-metal body, on the other hand, consists of a skeleton frame formed of metallic stampings, integrally secured together and applied and integrally secured to curved, sheet metal panels forming the body shell, so as to reinforce said panels and tie them together. This type of body has many advantages over the composite type, but the cost of the dies necessary to produce it is relatively large.

One of the objects of my present invention is to provide a touring car body for automobiles, which combines the low die cost of a composite body with many of the advantages of an all-metal body, inasmuch as the wooden framework is made very simple and all-metal body units, such as cowl, front seat and tonneau units, are mounted upon or secured to this wooden framework to form the complete touring car body.

Another object of my present invention is to provide a touring car body for automobiles comprising a simple, wooden underframe and all-metal cowl, front seat and tonneau units rigidly secured thereto, each of said units including metal door posts.

Another object of my present invention is to provide an automobile body construction in which cowl, front seat and tonneau units, each of said units comprising a body shell panel reinforced by metallic stiffening members so as to be self-supporting and self-sustaining, are rigidly mounted on a wooden underframe.

In many motor vehicles, the chassis frame is elevated at its rear end, where it passes over the rear axle. This elevated rear portion of the frame is known as the "kick-up". The sills of the automobile body are applied to and secured to the chassis frame, and, consequently, the body sills have to be provided with a "kick-up" corresponding to the "kick-up" of the chassis frame. In prior automobile bodies using wooden sills, this "kick-up" has added very greatly to the cost of the body sills, inasmuch as it adds to the waste of lumber in making the sills and also requires skillful carpenter work.

A further object of my present invention is to provide an automobile body construction, for bodies having a "kick-up" at the rear end thereof, in which the wooden body sills are straight and the "kick-up" is formed in the tonneau unit which is rigidly secured to the rear ends of the straight wooden sills.

Another object of my present invention is to provide an automobile body construction having a wooden underframe, on which the cowl and front seat units are mounted, and a tonneau unit, provided with a metal framework including tonneau sills, connected to the rear ends of the wooden underframe so as to simplify the construction of the wooden underframe and lessen the cost thereof and of the body.

A further object of my invention is to provide an automobile body construction in which the rear seat is so supported as to lower the center of gravity of the loaded car, in other words, a body construction in which the rear seat is so supported and fastened in the tonneau that it is positioned lower in the tonneau than in the case of bodies known heretofore.

A further object of my invention is to provide an improved automobile body construction, which is strong and durable and may be produced economically and efficiently.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view in side elevation of a body constructed in accordance with my invention.

Fig. 2 is a vertical, longitudinal, sectional view through the forward portion of the body.

Fig. 3 is a vertical, longitudinal, sectional view through the rear portion of the body.

Fig. 4 is a vertical, transverse view through the body, taken on the line 4—4 of Fig. 2.

Fig. 5 is a fragmentary, sectional view through one side of the front seat unit, taken on the line 5—5 of Fig. 2.

Fig. 6 is a horizontal, transverse view through the cowl unit, taken on the line 6—6 of Fig. 2.

Fig. 7 is a fragmentary, sectional view through the forward portion of the cowl unit, taken on the line 7—7 of Fig. 2.

Fig. 8 is a detail, sectional view through the door post at the rear edge of the front door opening, taken on the line 8—8 of Fig. 2.

Fig. 9 is a detail, sectional view through the upper edge of the side panel of the front seat unit, taken in the line 9—9 of Fig. 2, and Fig. 10 is a fragmentary, sectional view through one side of the tonneau unit, taken on the line 10—10 of Fig. 3.

In the drawings, the same reference numerals refer to identical parts throughout the several views and the sectional views are taken looking in the direction of the arrows at the ends of the section lines.

The cowl unit may include a cowl panel pressed to the desired curvature to form the portion of the body shell in front of the front door openings and reinforced by various cross panels and metallic stiffening bars or angle members forming front door posts, so as to constitute a self-sustaining unit. The front seat unit may include a panel, or panels, pressed to the desired curvature to form the sides and back of the front seat and reinforced by various cross panels and by vertical, reinforcing bars or angle members forming door posts, so that the front seat unit constitutes a self-sustaining unit which is rigidly secured to and mounted on the wooden underframe. The tonneau unit may include a tonneau panel curved to form the rear portion of the body shell and reinforced by a tonneau frame including tonneau sills and a rear cross member. The tonneau unit may also be reinforced by suitable reinforcing bars, or angle members, secured to the tonneau panel and forming the rear door posts for the rear door openings. This tonneau unit forms a self-sustaining, all-metal unit which is rigidly connected to the rear end of the wooden under-frame. The tonneau sills of the tonneau unit may be so formed as to provide a "kick-up" therein to correspond with the "kick-up" in the chassis frame and the forward ends of these tonneau sills may be rigidly connected to the rear ends of the wooden body sills.

In accordance with another feature of my invention, the tonneau sills and cross-members may be formed of angle members having a lower, horizontal flange to which the supporting structure for the rear seat may be secured. This construction permits the rear seat to be supported from points substantially in line with the lower edges of the tonneau sills rather than from points substantially in line with the upper edges of the tonneau sills and cross member, as has been the practice heretofore. This results in a lowering of the rear seat, with reference to the tonneau, by a distance equal to the height of such tonneau sills and cross members, resulting in a lowered center of gravity for the loaded car, so that the automobile is easier to ride in and does not tend to sway from side to side.

Referring to the numbered parts of the drawing, in which I have illustrated a touring car body which constitutes one embodiment of my invention, it will be seen that the touring car body illustrated comprises a cowl panel, 10, a tonneau panel, 11, side panels, 12, front doors, 13, and rear doors, 14. There is also an arched panel, 17, which connects the side panels, 12, at the back of the front seat. Sill covers, 15 and 16, constitute those portions of the body shell beneath the front and rear door openings. The tonneau panel, 11, has inwardly-pressed side portions, 18, forming the wheel-housings, portions of said wheelhousings being pressed into single planes, forming the plane surfaces, 18', for the purposes presently to be described.

The body is provided with a wooden underframe to which the several all-metal body units are rigidly connected. This wooden underframe is made up of a pair of longitudinally-extending body sills, 19, which are connected by the several cross-members, 20, 21 and 22. The cross-members, 20, may also support the front seat, and the cross-members, 22, may serve as a part of the tonneau floor. The sills, 19, have the ledges, 41, formed therein to receive the ends of removable floor boards, (not shown).

The cowl unit comprises a cowl panel, 10, which is arched and formed into the desired curvature to constitute that portion of the body shell in front of the front door opening. The forward edge portions of the cowl panel are bent laterally, forming the inwardly-extending flange, 23, to which the flange, 23', on the edge of a shroud pan, 24, is rigidly secured by welding or otherwise.

This shroud pan, 24, constitutes a reinforcing panel or cross-member, extending across and strengthening the forward portion of the cowl unit, and the body portion of the shroud pan is offset from the flange, 23', so as to provide a stiffening, channel formation at the forward portions of the cowl unit. The central portion of the shroud pan may be cut away to form a recess therein, through which the steering column and other connections for the motor extend, and provided with a marginal flange, 25, surrounding this opening, which merges, at 25', into the inclined surface shown in Fig. 2 of the drawing. Brackets, 26, are rigidly secured to the forward ends of the body sills, 19, and to the shroud pan, 24, (see Figs. 2 and 7). Rear edge portions of the cowl panel, 10, are flanged inwardly and the door posts, 27, are rigidly secured by welding or otherwise to said flange. These door posts are channel-shaped in cross section, as shown in Fig. 6, and merge, at their upper ends, into the inwardly and forwardly-extending angle member, 28, which bridges the cowl unit and is rigidly secured by welding or otherwise to the flange, 29, at the rear upper edge of the cowl panel. This feature of my invention is described and claimed in my pending application for Letters Patent for automobile bodies and the method of making the same, Serial No. 484,674, filed July 14th, 1921, to which application cross-reference is hereby made. An instrument board, 30, is rigidly secured to this member, 28, as shown in Fig. 2. The cowl unit is also reinforced by the brackets, 31, extending between the shroud pan, 24, and the door posts, 27, and also providing supporting means for the windshield stanchions, (not shown). This feature of my invention is described and claimed in my pending application for Letters Patent for steel bodies for automobiles, Serial No. 336,059, filed November 6, 1919, to which application cross-reference is hereby made. The cowl unit is also reinforced by the transverse panel, 32, having a downwardly-extending flange, 33, at its forward edge, which is rigidly secured, by welding or otherwise, to the shroud pan, 24. The rear edge portion of this panel, 32, is folded upon itself to form a groove, 35, which receives the flange, 36, on the lower edge of the instrument board panel, 30. Brackets, 37, are rigidly secured to the body sills, 19, and to the door posts, 27, of the cowl unit. The cowl panel, 10, has its lower edge portions bent inwardly, forming the flanges, 38, which are applied and secured to the lower surfaces of the body sills, 19. It will be observed that the cowl panel is so reinforced and strengthened by the various cross members or panels and by the door posts, as to form a rigid, self-sustaining unit, which unit is mounted on or secured to the forward end of the wooden underframe, by the brackets, 26 and 37. Angle members, 42, are secured within the cowl in an inclined position the forward and upper ends of said members being secured to the shroud pan, 24, while the lower or rear ends are rigidly connected to the body sills, 19. These angle members form supports for the toe-boards.

The sill covers, 15, beneath the front door openings, are provided with flanges, 39 and 40, applied and secured to the lower and upper surfaces, respectively, of the body sills, 19. The front seat unit comprises the side panels, 12, one at each side of the body, the forward edge portions of which are turned inwardly forming the flanges, 45, to which the angle members, 43, are rigidly secured by welding or otherwise, constituting the door posts at the rear edges of the front door openings. The upper portions of these angle members, 43, are provided with rearwardly-extending flanges, 44, giving the door post a channel section, as shown in Fig. 8. The side panels and door posts are connected by the transversely-extending heelboard panel, 46, which is curved to provide the forward, transverse portion and the rearwardly-extending, side portions which are secured to the lower parts of the door posts, 43. A flange, 47, at the lower edge of the heel-board panel, is rigidly connected to the sills, 19, and the cross member, 20, upon which it rests. The upper edge of the transverse portion of the heel board is formed with a forwardly-extending flange, 48, to which the transverse portion of the cushion retainer, 49, is secured. This cushion retainer is curved to correspond to the heel-board and the rear ends thereof are secured to the door posts, 43. The side seat supports, 50, are secured to the side portions of the heel board, 46, and extend rearwardly therefrom to the seat back panel, 61, which will be described presently. These side seat supports, 50, each have a laterally-extending ledge, 51, which support the cover for the compartment beneath the front seat. A cross rail, 52, is secured to a portion of the seat back panel, 61, and extends between the rear ends of the side seat supports, 50, as shown in Fig. 2. The lower edge portions of the side panels, 12, are bent inwardly, forming the flanges, 53, which are applied and secured to the lower surfaces of the sills, 19.

The upper edge portions of the side panels, 12, are flanged inwardly, as shown in Fig. 9, and garnish rails, 54, are secured thereto. The upper rear portions of the side panels, 12, are connected by the cross panel or member, 17, which is curved to form the rear upper portion of the front seat back. The forward edge of this cross panel, 17, is formed with a downwardly extending flange, 56, which is curved to form a continuation of the garnish rails, 54. The rear edge portion of the cross panel, 17, is also provided with a downwardly-extending flange, 57. This cross member, 17, also has inwardly extending flanges, 58, which merge into flanges formed on the rear edge portions of the side panels, 12, corresponding to the flanges, 45. The door posts at the front edges of the rear door openings are formed by Z-shaped members, 59, having laterally-extending flanges at their rear edges secured to the said flange on the rear edge portions of the side panels, (see Fig. 5) and inwardly-extending flanges on the inclined forward edges thereof. Brackets, 60, are secured to the sills, 19, and also to the lower ends of the door posts, 59, as shown in Figs. 2 and 5.

The back of the front seat is formed by a panel, 61, the central portion of which is curved, forwardly, as shown in Fig. 2, while the upper portion, 63, is substantially vertical and terminates in the flange, 62, secured to the cross panel, 17. The lower portion of this panel, 61, is inclined forwardly, at 64, so as to form a continuation of the side seat supports, 50, and support the rear end of the seat cushion. From the forward edge of this portion, 64, the seat back panel extends downwardly, at 65, terminating in the flange, 66, at its lower edge, the ends of which flange rest upon the ledges, 41, of the sills, 19. A transverse panel, 67, forming a part of the floor of the body, is supported by the flange, 66, and by the ledges, 41, of the sills, as shown in Fig. 2. The feet, or ears, 68, are pressed forwardly from the portion, 65, of the seat back panel, 61, and are secured to the cross members, 20, as shown in Fig. 2. The forward curved-in portion of the panel, 61, forming the back of the front seat, affords a space in the rear thereof for the storing of auxiliary folding seats. This seat storage space is partitioned off by means of the vertical partitions, 69, which rest on the panel, 67, with their rear edges substantially in line with the portion, 63, of the seat back panel, (see Fg. 2). The partitions, 69, at the outside of the body, are connected by the filler pieces, 69', with the forward flanges of the door posts, 59, as shown in Fig. 5. The portion, 64, of the seat back panel, forming the support for the rear end of the seat cushion, is reinforced by the flanged plates, 70, positioned between it and the panel, 67, in line with the partitions, 69, as shown in Fig. 2. The two innermost partitions, 69, may be connected by a filler member, 71, as shown in Fig. 4. The sill covers, 16, forming that portion of the body shell beneath the rear door openings, are provided with the inwardly-extending flanges, 72 and 73, which are applied and secured to the upper and lower surfaces, respectively, of the body sills, 19.

The tonneau unit is rigidly connected to the rear end of the wooden under-frame and may comprise a tonneau panel pressed to the desired form and curvature to form the rear portion of the body shell and stiffened and reinforced by suitable framework, so as to form a self-sustaining and self-supporting all-metal body unit. This framework may include tonneau side sills which may be formed from metallic angle members curved to provide the "kick-up" at the rear end of the body. This framework may also carry the supporting structure for the rear seat cushion and I find it very desirable to secure such supporting structure to a lower flange of the tonneau frame, by which means I lower the center of gravity of the loaded body very materially, since the rear seat cushion is positioned lower in the tonneau than has been customary heretofore. Referring to Figs. 3 and 10 of the drawings, the tonneau panel, 11, which, as I have stated, is curved to form the rear portion of the body shell and is provided with the inwardly-pressed wheelhousings, 18, has a laterally-extending flange, 74, at its upper edge. This flange is curved to conform to the curvature of the tonneau panel and a garnish rail, 75, is rigidly secured thereto by welding or otherwise. The tonneau frame comprises a rear cross member, 76, and a pair of tonneau side sills, 77, the latter being curved downwardly, at 78, so that the rear portions of said side sills lie in a horizontal plane above the forward portions thereof, thus giving the desired "kick-up" at the rear portion of the body. The tonneau side sills and rear cross member, 76, are formed from metallic angle members, as shown, having horizontally-extending flanges at their lower edges. The lower edge portions of the tonneau panel, 11, are pressed inwardly, forming the flange, 79, which extends beneath and is rigidly secured by welding or otherwise to the lower flanges of the tonneau side sills, 77, and the rear cross member, 76. The forward end of the vertical flange of each of the side sills, 77, is curved laterally at 81 and secured to the wheelhousing, 18, as shown in Fig. 10, and the forward portion of the horizontal flange of the side sill extends beneath the rear cross member, 21, of the wooden underframe and is rigidly secured thereto and to the rear end of the body sill, 19, lying in a recess, 80, formed in the latter.

The forward edge portions of the tonneau panel are bent laterally, at 84, and a door post, 82, is secured thereto by welding or otherwise. This door post is preferably channel-shaped in cross section and the lower portion thereof is bent forwardly, at 83, roughly paralleling the curve of the forward portion of the wheelhousing, as appears from Fig. 3. The forward portions of the tonneau unit are reinforced by the bracket members, 85, secured to the sides of the wheelhousing and having their upper portions, 86, twisted into a plane at right angles to the lower portions and secured inside the portions, 82, of the door posts. These brackets, 85, are formed at their lower ends with horizontally-extending feet, 85', which extend above and are secured to the cross member, 21, of the wooden underframe.

It will be recalled that the wheelhousings are provided with plane portions, 18'. These plane surfaces greatly facilitate the mounting and securing of the supporting structure for the rear seat and are formed for that purpose. Triangular supporting members, 87, are secured to the vertical flanges of the rear portions of the tonneau side sills, 77, and to the adjacent plane surfaces, 18', of the tonneau panel, as shown in Fig. 3. Each of these members, 87, has a flange, 88, at its upper edge, which is inclined rearwardly so as to form a surface sloping towards the rear ends of the tonneau side sills. These supporting members, 87, one at each side of the tonneau, support the seat pan, 89, for the rear seat, the side edges of the rear seat pan resting upon the flanges, 88, of the members, 87, and being secured thereto. A flange, 90, formed at the rear edge of the seat pan, 89, rests upon and is rigidly secured to the horizontal flange at the lower edge of the rear cross member, 76, as shown in Fig. 3. The forward portion of the seat pan, 89, is supported by the heel board panel, 91, the upper portion of which is inclined forwardly, at 92, to form a supporting ledge for the seat pan, and then bent upwardly, at 93, to form a cushion retainer, the ends of which are bent laterally, forming ears, 93', which may be rigidly secured by welding or otherwise to the plane portions, 18', of the tonneau panel, so as to rigidly secure the heel board in position. This heel board may also be provided with the laterally-extending ears, 94, which are likewise secured to the plane portions, 18', of the tonneau panel. The lower portion of the heel board panel, 91, extends forwardly, at 95, forming a part of the floor of the tonneau, and being supported by and secured to the lower horizontal flanges of the tonneau side sills, 77, and the rear cross member, 21, of the wooden under-frame. The tonneau panel may also be reinforced by braces, 96 and 97, extending between the wheelhousings and the garnish rail, 75, or the flange, 74, which braces may also serve as supports for the top irons.

The seat pan supporting construction disclosed herein is substantially disclosed and broadly claimed in my copending application for Letters Patent for improvements in automobile bodies, Serial No. 484,674, filed July 14, 1921, to which cross reference is hereby made. The issuance of this patent is not to be construed as an abandonment of the subject matter disclosed but not claimed herein, as such subject matter is claimed in said pending application.

In these constructions I realize in full the stated objects of my invention. The wood underframe, being straight and of substantially plane form, is simple and lends itself to strong construction at small expense. The wooden underframe is of plane form by reason of the fact that it consists of substantially rectilinear body sills inter-braced by cross members disposed in substantially the horizontal plane of said sills. When the self-contained and self-sustaining cowl front seat and tonneau units are secured to these sills, these all-metal units by virtue of their self-sustaining character complete a body construction strong and durable in entirety despite the fact that wooden sills are used. That one point which most commonly develops weaknesses, to wit: the kick-up portion, has its weakness converted into strength by the change from wood to metal at this point. Wood lends itself to such irregular construction, but weakly and extensively; whereas metal lends itself strongly and inexpensively. On the other hand, in rectilinear work no materials may be fabricated more cheaply than wood.

I am aware that the automobile body construction which I have described here in detail may be varied and altered considerably without departing from the spirit of my invention and, therefore, I claim my invention broadly, as indicated by the appended claims.

Having thus described my invention, what I claim as new and useful and desire to secure by Letters Patent is:

1. A composite sill for automobile bodies comprising a substantially rectilinear fore portion of wood, and an upwardly offset hinder portion of angle metal, said metal portion overlapping the wooden portion and being rigidly secured thereto.

2. A body structure for automobiles comprising a wooden underframe of substantially plane form including longitudinally extending body sills connected by cross braces and a pressed metal tonneau unit having pressed metal side sills offset from the wooden body sills and having their forward ends overlapping the rear ends of said wooden sills and secured thereto.

3. A body structure for automobiles comprising a wooden underframe of substantially plane form including longitudinally extending body sills connected by cross braces and a pressed metal tonneau unit having pressed metal side sills of angle form telescoped over the rear ends of said wooden sills and secured thereto, said pressed metal sills having the greater portions thereof offset upwardly.

4. A body structure for automobiles comprising a pair of longitudinally-extending wooden body sills and a pair of metal sill members rigidly connected to the rear ends of said body sills and offset upwardly so that their rear ends lie in a plane above the body sills, a cowl panel rigidly secured to the forward ends of said wooden body sills and a tonneau panel rigidly secured to said metal sill members.

5. A body structure for automobiles comprising a pair of longitudinally-extending wooden body sills and a pair of metal sill members rigidly connected to the rear ends of said body sills and offset upwardly so that their rear ends lie in a plane above the body sills, a cowl panel rigidly secured to the forward ends of said wooden body sills, a tonneau panel rigidly secured to said metal sill members and seat supports carried by said metal sill members.

6. A body structure for automobiles comprising a skeleton frame including a pair of longitudinally-extending wooden body sills connected by suitable cross braces, pressed metal sill members constituting continuations of said body sills and rigidly connected to the rear ends thereof, said sill members being offset upwardly, door posts rigidly secured to said sills, and a body shell including sheet metal panels curved to conform to the curvature of the body and applied externally and rigidly secured to said skeleton frame.

7. In a body structure for automobiles, a tonneau panel curved to form the rear portion of the body shell, the side portions of said panel being pressed inwardly to form the wheelhousings parts of which are formed so as to lie in a single plane, providing vertical plane surfaces extending longitudinally of the body, a metal framework reinforcing the lower portion of said tonneau panel and secured thereto, and seat supports carried by said framework and secured thereto and to the plane surfaces of said wheelhousings.

8. A body structure for automobiles comprising a pair of longitudinally extending wooden body sills and a pair of metal sill members rigidly connected to the rear ends of said body sills and offset upwardly so that their rear ends lie in a plane above the body sills, a rear cross member connecting the rear ends of said metal sill members, said metal sill members and cross member being of angular cross section having horizontal flanges at their lower edges, a cowl panel rigidly secured to the forward ends of said wooden body sills, a tonneau panel having its lower portions rigidly secured to said metal sill members and cross member, a heel-board panel resting on and secured to the horizontal flanges of said metal sill members, the lower portion of said heel-board panel extending forwardly forming a part of the tonneau floor, and a seat pan having its forward edge supported by said heel-board panel and its rear edge seating on and secured to the horizontal flange of said rear cross member.

9. In an automobile body structure, a tonneau section having panels formed to constitute the wheel housings of curvilinear section, portions of said curvilinear walls struck to plane form, and seat-supporting elements secured integrally to said plane walls.

10. In a body structure for automobiles, a skeleton frame constituting the intermediate section of a complete automobile body, said frame including a pair of longitudinally extending wooden body sills suitably interbraced, and an independently assembled unitary tonneau structure including a pair of longitudinally extending metallic sills, said tonneau unit being mounted as a whole upon said wooden body sills.

11. In an automobile body structure, an independently assembled cowl unit including a cowl panel arched and formed into the desired curvature, a shroud pan secured to the forward edges of said cowl panel, and a reinforcing panel extending transversely of said cowl and supported at its forward edge by said shroud pan.

12. In an automobile body structure, an independently assembled cowl unit including a cowl panel arched and formed into the desired curvature, a shroud pan secured to the forward edge of said cowl panel, an instrument board secured to the transversely extending rear edge of said cowl panel, and a panel spaced from the top of said cowl panel and secured at its forward and rear edges, respectively, to said shroud pan and said instrument board.

13. In an automobile body structure, a front seat back assembly including a pair of side panels having garnish rails secured thereto, and a cross panel connecting said side panels, said cross panel being curved to form the rear upper portion of said seat back, and having a downwardly extending flange at its forward edge curved to form continuations of said garnish rails.

14. In an automobile body structure, a front seat back assembly including a pair of side panels, a horizontal panel extending transversely of the body and interconnecting said side panels, and a substantially vertically disposed panel constituting the seat back proper, said latter panel being secured at its upper edge to the lower surface of said transversely extending panel.

15. In an automobile body structure, a pair of longitudinally extending sills, a sheet metal panel interconnecting said sills, a second sheet metal panel forming the support for the rear end of a seat cushion, mounted upon and secured to said first mentioned panel, and a flanged plate vertically positioned between said panels whereby to reinforce said seat supporting panel.

16. In an automobile body structure, a pair of longitudinally extending sills, a pair of side panels mounted upon said sills, transversely extending panels respectively interconnecting said pairs of side panels and sills, and a substantially vertically inclined panel secured at its upper and lower edges to said transversely extending panels.

17. In an automobile body structure, a front seat assembly including a pair of side panels having inwardly turned flanges at the rear vertical edges thereof, Z-shaped stampings having the outwardly extending branches thereof secured to said flange and the main body portions thereof extending parallel to said side panels whereby to constitute channel shaped door posts, and filler pieces extending inwardly from the main body portions of said stampings and secured to the inwardly extending branches thereof.

In testimony whereof, I affix my signature.

JOSEPH LEDWINKA.